United States Patent [19]
Griffith et al.

[11] B 3,983,323
[45] Sept. 28, 1976

[54] FULL-DUPLEX DIGITAL TRANSMISSION LINE SYSTEM

[75] Inventors: Ernest S. Griffith, St. Louis Park; William W. Davis, Minneapolis, both of Minn.

[73] Assignee: Sperry Rand Corporation, New York, N.Y.

[22] Filed: Sept. 24, 1973

[21] Appl. No.: 399,908

[44] Published under the second Trial Voluntary Protest Program on January 13, 1976 as document No. B 399,908.

[52] U.S. Cl. ............................ 178/58 R; 179/2 DP
[51] Int. Cl.² ...................... H04L 5/14; H04B 3/50
[58] Field of Search ................... 178/58 R, 59, 60; 343/175, 180; 179/2 DP

[56] References Cited
UNITED STATES PATENTS

| | | | |
|---|---|---|---|
| 1,619,041 | 3/1927 | Salinger | 178/60 |
| 3,566,031 | 2/1971 | Carbone | 178/59 |
| 3,704,346 | 11/1972 | Smith | 179/18 BE |
| 3,730,993 | 5/1973 | Moriyasu | 178/59 |
| 3,775,561 | 11/1973 | Guckel | 178/58 R |
| 3,812,292 | 5/1974 | Tink | 179/2 DP |

*Primary Examiner*—Kathleen H. Claffy
*Assistant Examiner*—E. S. Kemeny
*Attorney, Agent, or Firm*—Kenneth T. Grace; Thomas J. Nikolai; Marshall M. Truex

[57] ABSTRACT

A finite drive impedance, unbalanced transmission line system for transmitting only the differentiated transitions of a binary level digital signal is disclosed. The transmission line arrangement includes two identical, balanced-bridge transceivers at opposite ends of a coaxial cable whose alternating current (AC) transmission line characteristics are utilized to maintain waveform timing, i.e., the spacing between the differentiated transitions, independent of transmission line length. Integrated circuit (IC) transistor-transistor-logic (TTL) is utilized for the active elements.

6 Claims, 3 Drawing Figures

$(T_N - T_O)$ = TIME DELAY TO DIRECTIONAL COUPLER DC1
$(T_K - T_O)$ = TOTAL PROPAGATION DELAY
$(T_M - T_O)$ = TIME DELAY TO DIRECTIONAL COUPLER DC2

WAVEFORMS SHOWN AS VIEWED ON AN OSCILLOSCOPE WITH TIME BASE INCREASING TO THE RIGHT

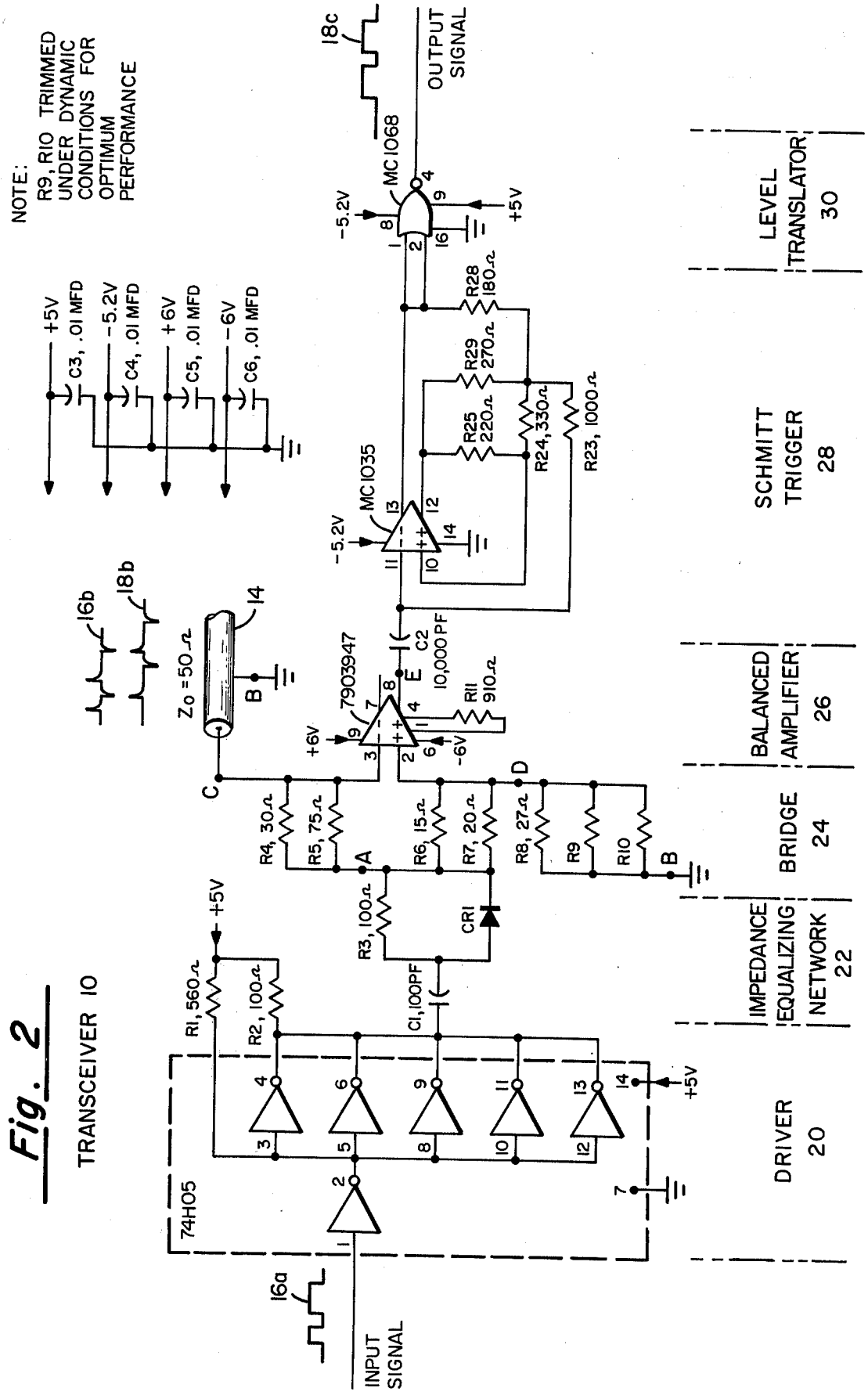

FULL-DUPLEX DIGITAL TRANSMISSION LINE SYSTEM

BACKGROUND OF THE INVENTION

Full duplex transmission, i.e., simultaneous transmission and reception of an electrical signal at both ends of a single transmission line, of digital signals is well known. In the data processing art in which the high frequency transmission of binary digits, i.e., bits, representative of 1's and 0's between modular elements is often required, full duplex transmission is utilized to reduce the number of transmission lines therebetween. In the W. J. Davis U.S. Pat. No. 3,725,582 there is disclosed one prior art transmission line system including a balanced transmission line for the transmission of binary level direct current (DC) signal levels. Such system includes a resistor bridge network of high impedance with respect to the transmission line and terminating resistors for bridge balance with an assumed zero drive impedance. The present invention is considered to be an improvement over such prior art systems.

SUMMARY OF THE INVENTION

The present invention is comprised of two identical transceivers at opposite ends of a coaxial cable transmission line. At the transmitting end, the binary level digital input signal, a pulse-like two-level DC signal, is differentiated for coupling only the derivative of the digital input signal transitions to a resistor bridge network. The resistor values of the bridge network are chosen such that a differential amplifier across one leg of the bridge network sees a zero differential signal while a coaxial cable across another leg of the bridge network sees a substantial differential signal. This substantial differential signal, which is comprised of alternate polarity spikes of fast rise and fall times of a time separation determined by the input signal waveform or pulse length, is transmitted by the coaxial cable to the receiving end. The differential amplifier at the receiving end sees a substantial differential signal which is integrated to provide as an output signal the reproduction of the input signal. The transmitted AC signal seen by the coaxial cable utilizes the AC characteristics of the transmitting coaxial cable to maintain the integrity of the input signal, output signal waveforms.

BRIEF DESCRIPTION OF THE DRAWINGS

FIG. 2 is a circuit schematic of the transceivers of FIG. 1.

DESCRIPTION OF THE PREFERRED EMBODIMENT

Figure 1:
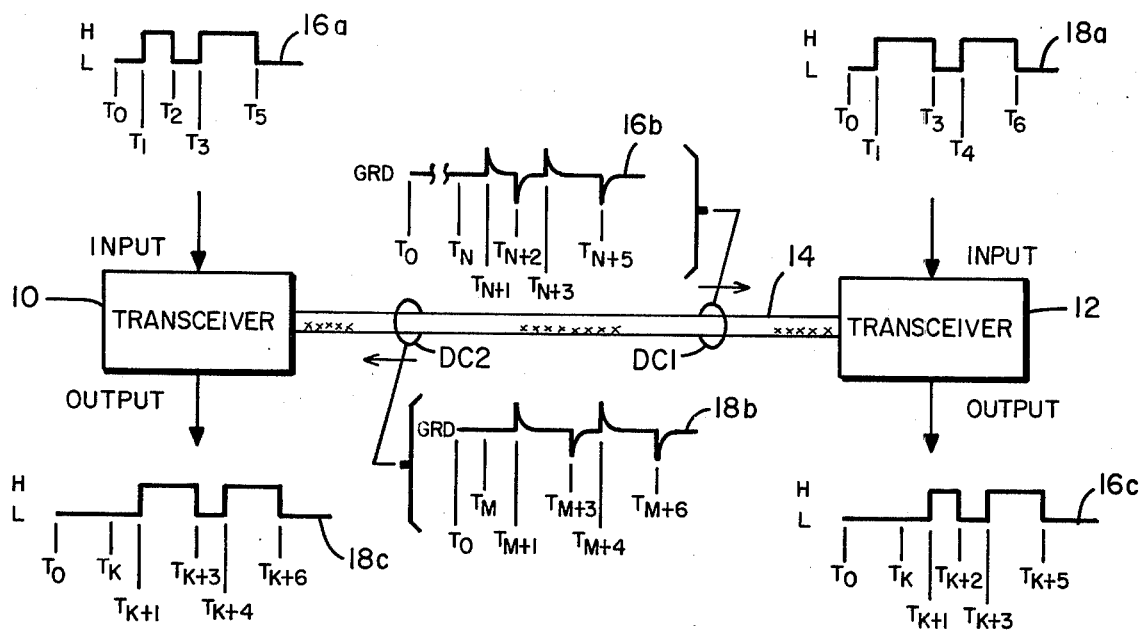
FIG. 1 is a block diagram of the transmission line system of the present invention.

With particular reference to FIG. 1 there is presented a block diagram of the transmission line system of the present invention. The illustrated transmission line system is comprised of two identical transceivers 10 and 12 intercoupled by a single coaxial cable 14. In a typical operation, transceiver 10 receives input signal 16a (shown as viewed with an oscilloscope), differentiates input signal 16a coupling to coaxial cable 14 the transmitted signal 16b (shown as viewed with an oscilloscope and directional coupler DC1), which is the derivative of input signal 16a. Transceiver 12 receives the transmitted signal 16b, integrates it and emits the integrated output signal 16c (shown as viewed with an oscilloscope) which is a reproduction of the input signal 16a. Concurrently, and in a similar manner, transceiver 12 receives input signal 18a (shown as viewed with an oscilloscope), differentiates input signal 18a and couples to coaxial cable 14 the differentiated transmitted signal 18b (shown as viewed with an oscilloscope and directional coupler DC2) which at transceiver 10 is integrated to emit the integrated output signal 18c (shown as viewed with an oscilloscope) which is the reproduction of the input signal 18a. The differentiated transmitted signals 16b and 18b are comprised of alternate polarity spikes of short duration rise and fall times having a time separation determined by their associated input signals 16a and 18a. These AC transmitted signals 16b and 18b utilize the AC transmission line characteristics of the transmitting coaxial cable 14 to maintain the integrity of the input signal, output signal waveforms.

With particular reference to FIG. 2 there is presented a detail circuit schematic of the transceiver 10 of FIG. 1. The TTL generated input signal is coupled to driver 20 which is formed of a 6 inverter IC element to power amplify the TTL input signal to provide sufficient power to drive the impedance equalizing network 22 and the Wheatstone bridge 24 having the four external legs AD, DB, BC, CA and an internal leg DC between the nodes A, B, C, D. Capacitor C1 and the serially following apparent resistance of R3 and the legs of bridge 24 function as a differentiator converting the binary level digital input signal 16a to the AC transmitted signal 16b on coaxial cable 14. The transmitted signal 16b is comprised of alternate polarity spikes of a time separation determined by the length and separation of the positive pulses of the waveform of input signal 16a. The differentiated input signal 16a from driver 20 that is internal to bridge 24 appears to the balanced amplifier 26 as a common mode signal, i.e., having no differential signal, across its inputs of nodes D,C, and, consequently, no signal due to input signal 16a is coupled to Schmitt trigger 28 and level translator 30. Thus, the input signal 16a is isolated from the circuitry following balanced amplifier 26 with its differentiated transmitted signal 16b coupled to coaxial cable 14.

When the differentiated transmitted signal 18b on coaxial cable 14 is coupled to bridge 24 across nodes B, C (with node B coupled directly to ground) it appears fully attenuated at one input to balanced amplifier 26 but unattenuated at the other input to balanced amplifier 26 so that a net differential signal exists across its two inputs of nodes D,C. This net differential signal from balanced amplifier 26 is reconstructed by Schmitt trigger 28 into a binary level digital signal waveform which by level translator 30 is translated back to TTL element levels as represented by output signal 18c.

Figure 3:
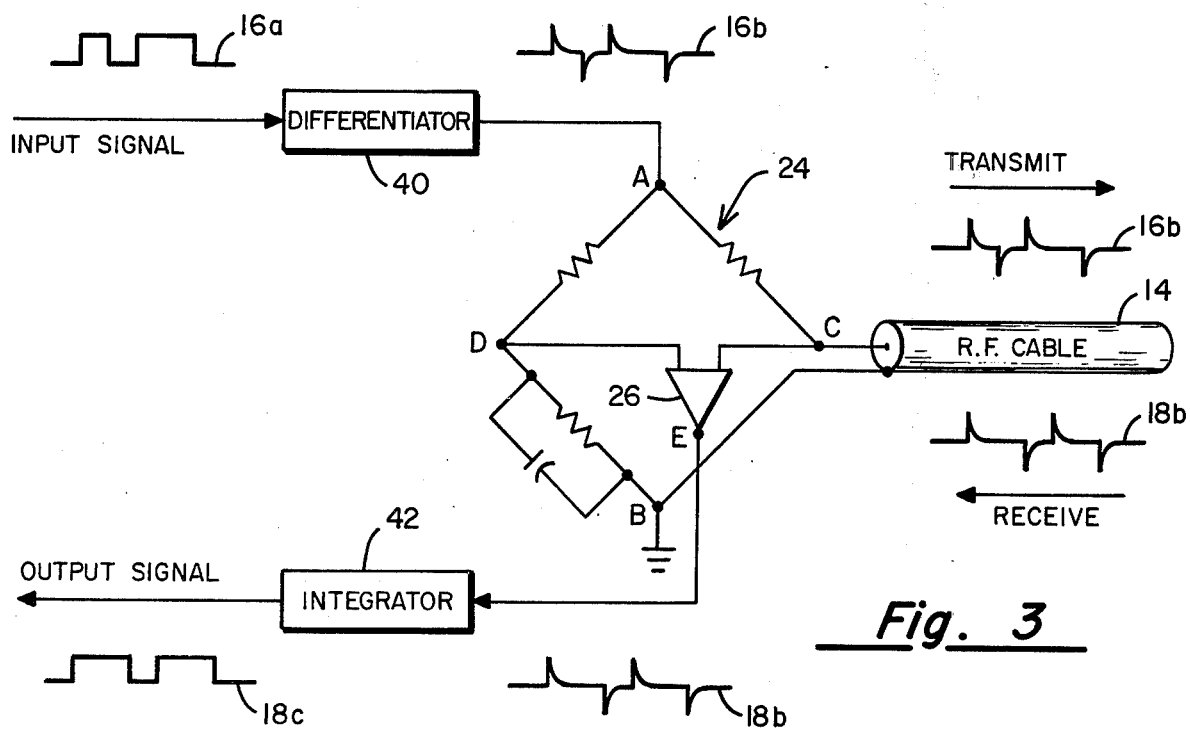
FIG. 3 is a simplified circuit schematic of the transceiver of FIG. 2.

With particular reference to FIG. 3 there is presented a simplified circuit schematic of the transceiver of FIG. 2. Using the preferred embodiment of FIG. 2 as an example, data transitions at the lengths and separations of the positive polarity pulses of input signals 16a, 18a, in which coaxial cable 14 is an RG-58 cable of 1000 feet in length, may occur as often as once every 40.0 nanoseconds (nsec) (25.0 megabaud) and in which the characteristic impedance of the RG-58 cable of 50.0 ohms is used as one leg of the Wheatstone bridge 24. Thus, the input impedance of each bridge 24 is designed to be 50.0 ohms to ensure that coaxial cable 14 is properly terminated on each end.

The input signal 16a is differentiated by differentiator 40 and appears across the leg AB, a portion of which appears across leg CB as the input signal to coaxial cable 14. However, resistors $R_4$, $R_5$; $R_6$, $R_7$; and $R_8$, $R_9$, $R_{10}$ (see FIG. 2) are chosen so that $V_{CB} = V_{DB}$ such that the output $V_{EB}$ of balanced amplifier 26 is zero. This ensures that the differentiated input signal 16a is not coupled to integrator 42.

A transmitted signal 18b from coaxial cable 14 appears across resistors $R_4$, $R_5$; $R_6$, $R_7$; and $R_8$, $R_9$, $R_{10}$ as $V_{CB}$, a portion of which signal appears as $V_{CD}$ across the input to balanced amplifier 26. This signal $V_{CD}$ is amplified and appears as a signal $V_{EB}$ to integrator 42 which reconstructs the received signal 18b to the output signal 18c. As bridge 24 is a linear element a transmitted signal 16b and a received signal 18b do not interfere with or cancel each other out. Even though a positive pulse from transmitted signal 16b and a negative pulse from received signal 18b may produce a net zero voltage at the cable interface (across nodes B,C) the superposition of both such signals across the input to balanced amplifier 26 (across nodes D,C) still produces a net differential voltage to drive integrator 42. Because both transmitted and received signals as seen by bridge 24 are comprised of alternate polarity spikes of a time separation determined by the input signal waveform and are of an AC nature, bridge 24 need not be balanced for DC signals.

What is claimed is:

1. A transceiver comprising:
   input means for receiving a binary-level, digital input signal;
   a Wheatstone bridge having four external legs AD, DB, BC, CA and an internal leg DC between the nodes A, B, C and D, said bridge formed of:
   first impedance means coupled between said nodes C, A for forming said leg CA;
   second impedance means coupled between said nodes A, D for forming said leg AD;
   third impedance means coupled between said nodes D, B for forming said leg DB;
   a single coaxial cable transmission line having its center conductor and its outer conductor coupled directly to nodes C and B, respectively, for forming said leg BC;
   an amplifier coupled between said nodes D, C for forming said leg DC and amplifying a portion of a differentiated received signal that is received from said transmission line;
   a capacitor coupled to said input means for differentiating said input signal and coupling a differentiated input signal to said node A of said Wheatstone bridge, a portion of which appears across said leg BC as a differentiated input signal to be transmitted by said transmission line;
   bistable means coupled to the output of said amplifier for converting the output of said amplifier to a binary-level, digital output signal.

2. The transceiver of claim 1 in which:
   said node B is coupled directly to ground;
   said impedances that form the legs CA, AD and DB include resistors that are chosen so that $V_{DC} = 0$ when said power amplified differentiated input signal is coupled by said driver to said node A;
   said impedances that form the legs CA, AD and DB include resistors that are chosen so that $V_{DC} \neq 0$ when said differentiated received signal is coupled by said transmission line between said nodes B, C.

3. The transceiver of claim 2 in which only one of said first, second or third impedance means includes a resistor and a capacitor parallel coupled between their respectively associated nodes.

4. A full-duplex digital transmission line system, comprising:
   an unbalanced, single coaxial cable transmission line having a center conductor and an outer conductor;
   first and second transceivers coupled to respective ends of said transmission line, each of said transceivers comprising:
   a driver for receiving a binary-level, digital input signal and providing a power amplified version thereof;
   a Wheatstone bridge having four external legs AD, DB, BC, CA and an internal leg DC between the nodes A, B, C and D, said bridge formed of:
   first impedance means coupled between said nodes C, A for forming said leg CA;
   second impedance means coupled between said nodes A, D for forming said leg AD;
   third impedance means coupled between said nodes D, B for forming said leg DB;
   said transmission line having its center conductor and its outer conductor coupled directly to nodes C and B, respectively, for forming said leg BC;
   a balanced amplifier coupled between said nodes D, C for forming said leg DC and amplifying a portion of a differentiated received signal that is received from said transmission line;
   a capacitor coupled to the output of said driver for differentiating said power amplified input signal and coupling a power amplified differentiated input signal to said node A of said Wheatstone bridge, a portion of which appears across said leg BC as a differentiated input signal to be transmitted by said transmission line;
   bistable means coupled to the output of said balanced amplifier for converting the output of said balanced amplifier to a binary-level, digital output signal.

5. The transmission line system of claim 4 in which:
   said node B is coupled directly to ground;
   said impedances that form the legs CA, AD and DB include resistors that are chosen so the $V_{DC} = 0$ when said power amplified differentiated input signal is coupled by said driver to said node A;
   said impedances that form the legs CA, AD and DB include resistors that are chosen so that $V_{DC} \neq 0$ when said differentiated received signal is coupled by said transmission line between said nodes B, C.

6. The transmission line system of claim 4 in which only one of said first, second or third impedance means includes a resistor and a capacitor parallel coupled between their respectively associated nodes.

* * * * *